Dec. 15, 1936. H. F. OXLEY ET AL 2,064,317
PROCESS FOR PERFORMING CHEMICAL REACTIONS
Filed Sept. 17, 1932
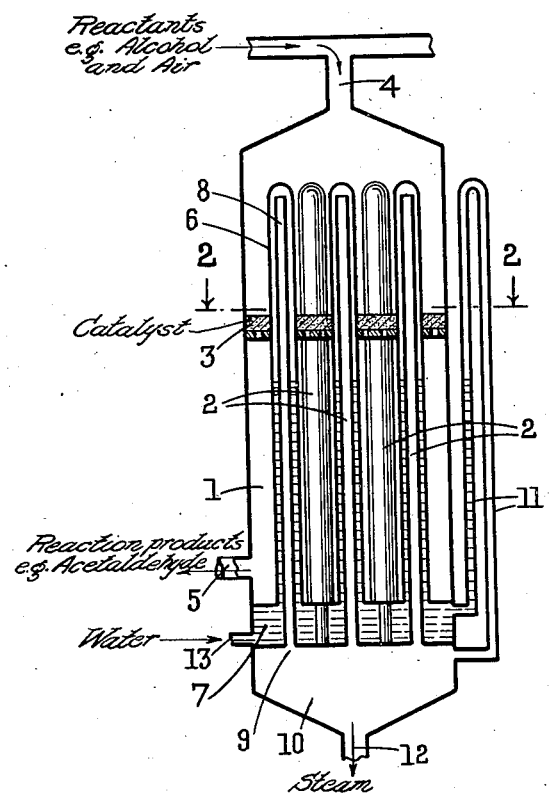
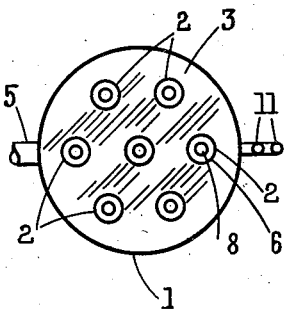
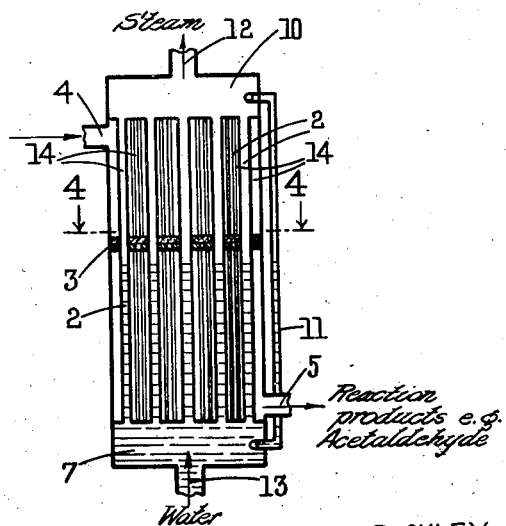
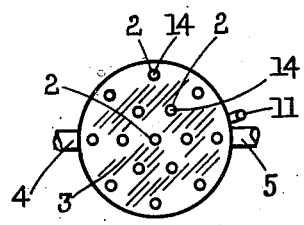
HORACE F. OXLEY
WALTER H. GROOMBRIDGE
INVENTORS
ATTORNEYS Patented Dec. 15, 1936

2,064,317

UNITED STATES PATENT OFFICE 2,064,317

PROCESS FOR PERFORMING CHEMICAL REACTIONS

Horace Finningley Oxley and Walter Henry Groombridge, Spondon, near Derby, England, assignors to Celanese Corporation of America, a corporation of Delaware Application September 17, 1932, Serial No. 633,564 In Great Britain September 24, 1931

24 Claims. (Cl. 260—138)

This invention relates to a process and apparatus for performing exothermic chemical reactions, and particularly exothermic catalytic reactions in the gaseous or vapor phase. The invention is especially concerned with the heat control of such reactions.

In the process and apparatus of the invention the heat generated by the reaction is controlled by the evaporation of water or other liquid which is placed in heat exchange relationship with the reaction in such manner that a very high and efficient exchange of heat between the water or other liquid and the reaction is attained.

According to the invention one or more hollow heat exchanging elements are provided in the reaction vessel or zone and water or other liquid is caused to move in said elements in the form of a travelling film, the motion of which is effected or aided by the generation of vapor from the liquid by the heat of the reaction.

Advantageously, the heat exchanging element or elements may be arranged vertically in the reaction vessel or zone, and the water or other liquid caused to ascent in said elements in the form of a climbing film, the upward motion of which is effected by the evaporation of the water or other liquid employed.

The invention is particularly useful for controlling exothermic catalytic reactions in the gaseous or vapor phase, and will be described hereinafter more particularly with reference to such reactions. In such reactions the heat exchanging elements may be arranged to control the temperature of the catalyst or beds or layers of catalysts in any convenient manner. Preferably a number of heat exchanging elements are arranged to traverse the catalyst or catalyst bed or layer, as by such means local overheating and consequent disadvantages thereof may readily be avoided. Conveniently a number of vertical heat exchanging elements may be arranged in or arranged to traverse a horizontal layer, bed or belt of catalyst or a plurality of such layers, beds or belts.

The heat exchanging elements may often advantageously be arranged in heat exchanging relationship with the gases or vapors to be subjected to the reaction and/or to the reaction products, as well as with the catalyst. For instance, by a suitable arrangement the heat exchanging elements may be caused to preheat the gases or vapors to be subjected to the reaction. Further, for instance, the hot gaseous or vaporous reaction products may, by a suitable arrangement, serve to heat the water or other liquid within the heat exchanging elements, and thereby augment or it may be even effect the motion of the film of evaporating liquid therein. Thus, for instance, the heat exchanging elements may extend beyond a catalyst bed, belt or layer on both sides thereof, on the one side the elements projecting into the path of the reaction gases or vapors passing to the catalyst and on the other side thereof into the path of the vapors or gaseous products of reaction passing from the catalyst, the heat exchanging elements on this latter side being connected to the supply of water or other liquid. In this arrangement the heat exchanging elements effect an efficient preheating of the incoming reaction gases or vapors, whilst the outgoing vapors or gaseous products effect or aid evaporation of the water or other liquid in the heat exchanging elements.

For the purposes of the invention we may employ any liquid to move in the heat exchanging elements in the manner above indicated, i. e. by a motion which is effected or aided by the vapor generated from the liquid by the heat of the reaction. Naturally the liquid to be employed will have a boiling point not exceeding that at which the reaction is to be performed. Preferably the liquid should have a boiling point lower or considerably lower than that at which the reaction is to be performed. Water is in general a very useful liquid as it combines with a very high latent heat a boiling point relatively low as compared with most or a large number of exothermic chemical reactions.

The accompanying drawing serves to illustrate forms of execution of the invention applied by way of example to an exothermic catalytic operation in the gaseous or vapor phase, e. g. the oxidation of alcohol to acetaldehyde. It is to be understood, however, that they are given solely by way of illustration.

Fig. 1 shows in section a converter or reaction vessel provided with one form of heat exchanging element;

Fig. 2 is a plan on lines 2—2 of Fig. 1;

Fig. 3 shows in section a reaction vessel provided with another form of heat exchanging element; and Fig. 4 is a plan on lines 4—4 of Fig. 3.

Referring to Figs. 1 and 2, the reaction vessel 1 is provided with a number of vertical heat exchanging elements 2 which traverse the horizontal catalyst belt, bed or layer 3. The reaction gases or vapors are introduced into the vessel 1 by the pipe 4, and after passing through the catalyst 3 leaves the vessel by the outlet pipe 5. Each of the heat exchanging elements is formed with an outer tube 6 closed at the top end and connected at the bottom end with a common water box 7, and an inner tube 8 open at the top end to communicate with the interior of the outer tube 6 and open at the lower end 9 to communicate with a common steam box 10. The space between the inner tube 8 and the outer tube 6 is suitably narrow so as to permit a climbing film of liquid to form by the evaporation of the water inside the space.

Assuming the apparatus to be in operation, the reaction gases or vapors, e. g. a mixture of alcohol and oxidizing gases (for instance a mixture of water vapor, alcohol vapor and air) enters the apparatus by the pipe 4, passes in contact with the upper parts of the heat exchanging elements, and to and through the catalyst 3 passing down into contact with the lower parts of the heat exchanging elements and out of the vessel by the pipe 5. Water is supplied to the tube 6 of the heat exchanging elements 2 from the water box 7, and is maintained at a suitable level inside the tubes by regulating the supply of water to said box from the inlet 13. The level of the water inside the tubes can be observed by means of the sight glass 11 which is connected on the one end to the water box 7 and on the other end to the steam box 10. The water in the outer tube 6 is maintained boiling by the heat of the reaction and climbs upwards in the outer tube 6 as a climbing film, the steam generated passing to the inner tube 8 and down to the steam box 10. By controlling the height of the water or other liquid in the tube 6 the heat of reaction can readily be controlled. The level should not rise above that of the catalyst, as it is necessary for the catalyst to be in heat exchange relationship with the climbing film. Usually it is desirable for the level to be maintained substantially below that of the catalyst bed. The steam leaves the apparatus by the pipe 12 and may, if desired, be employed for heating the gases or vapors to be subjected to the reaction. Similarly the heat contained in the reaction products and leaving the apparatus by the pipe 5 may be utilized for a similar purpose. Thus, for instance, in the case of oxidizing or other exothermic action upon alcohol or other organic vapors, the steam and/or the heat of reaction of the reaction products may be utilized in any convenient manner in the vaporization of the alcohol or other organic compound to be subjected to the reaction.

Figs. 3 and 4 show a similar form of apparatus to that shown in Figs. 1 and 2, but provided with heat exchanging elements formed from single tubes. Similar numerals in Figs. 3 and 4 represent corresponding parts in Figs. 1 and 2.

Referring to Figs. 3 and 4, it will be seen that whilst the apparatus is otherwise similar to that shown in Figs. 1 and 2, the heat exchanging elements are formed from single tubes 14, connected at their lower ends with the water box 7 and at their upper ends with the steam box 10. The apparatus is very similar in operation to that shown in Figs. 1 and 2. As in Figs. 1 and 2, the incoming reaction gases in Figs. 3 and 4 contact in some measure with the steam box 10, whereby they become preheated as well as by contact with the upper parts of the heat exchanging elements 2. The water evaporating in the tubes 14 climbs up the said tubes as a climbing film in a manner analogous to that described with reference to Figs. 1 and 2, but the steam generated passes directly up from the tubes to the steam box 10. Apart from these distinctions the apparatus functions in the same manner as that shown in Figs. 1 and 2.

What we claim and desire to secure by Letters Patent is:—

1. Method of controlling exothermic reactions carried out in the vapor phase, which comprises supplying a vaporizable liquid to a zone in proximity to, but separated from the reaction zone and forming a climbing film of said liquid in heat exchange relationship with the reaction zone.

2. The method of controlling exothermic catalytic reactions carried out in the vapor phase, which comprises supplying a hot vaporizable liquid to a zone in proximity to, but separated from the reaction zone and vaporizing said liquid, by means of heat withdrawn from the reaction products, so as to form a climbing film of said liquid in heat exchange relationship with the reaction zone.

3. Method of controlling exothermic catalytic reactions carried out in the vapor phase, which comprises supplying a hot vaporizable liquid to a zone in proximity to, but separated from the reaction zone and vaporizing said liquid, by means of heat withdrawn from the reaction products, so as to form a climbing film of said liquid in heat exchange relationship with the reaction zone and employing heat withdrawn from the reaction zone to preheat incoming reactants.

4. Method of controlling exothermic catalytic reactions carried out in the vapor phase, which comprises supplying a hot vaporizable liquid to a zone in proximity to, but separated from the reaction zone and vaporizing said liquid by means of heat withdrawn from the reaction products, so as to form a climbing film of said liquid in heat exchange relationship with the reaction zone, employing heat withdrawn from the reaction zone to preheat incoming reactants and removing the vapor of said liquid by a path surrounded by that followed by the climbing film.

5. Method of controlling exothermic catalytic reactions carried out in the vapor phase, which comprises supplying a hot vaporizable liquid to a zone in proximity to, but separated from a catalyst-containing reaction zone and vaporizing said liquid, by means of heat withdrawn from the reaction products, so as to form a climbing film of said liquid in heat exchange relationship with the reaction zone, employing heat withdrawn from the reaction zone to preheat incoming reactants and removing the vapor of said liquid by a path surrounded by that followed by the climbing film.

6. Method of controlling exothermic catalytic reactions carried out in the vapor phase, which comprises supplying water to a zone in proximity to, but separated from the reaction zone and vaporizing said water, with the aid of heat withdrawn from the reaction products, so as to form a climbing film of water in heat exchange relationship with the reaction zone.

7. Method of controlling exothermic catalytic reactions carried out in the vapor phase, which comprises supplying hot water to a zone in proximity to, but separated from the reaction zone and vaporizing said water, by means of heat withdrawn from the reaction products, so as to form a climbing film of water in heat exchange relationship with the reaction zone.

8. Method of controlling exothermic catalytic reactions carried out in the vapor phase, which comprises supplying hot water to a zone in proximity to, but separated from the reaction zone and vaporizing said water, by means of heat withdrawn from the reaction products, so as to form a climbing film of water in heat exchange relationship with the reaction zone, employing heat withdrawn from the reaction zone to preheat incoming reactants and removing the water vapor by a path surrounded by that followed by the climbing film.

9. In the production of acetaldehyde by the catalytic oxidation of ethyl alcohol, the steps of controlling the reaction by supplying water to a zone in proximity to, but separated from the catalyst-containing reaction zone and vaporizing said water so as to form a climbing film of water in heat exchange relationship with the reaction zone.

10. In the production of acetaldehyde by the catalytic oxidation of ethyl alcohol, the steps of controlling the reaction by supplying hot water to a zone in proximity to, but separated from the catalyst-containing reaction zone and vaporizing said water, by means of heat withdrawn from the reaction products, so as to form a climbing film of water in heat exchange relationship with the reaction zone.

11. In the production of acetaldehyde by the catalytic oxidation of ethyl alcohol, the steps of controlling the reaction by supplying hot water to a zone in proximity to, but separated from the catalyst-containing reaction zone and vaporizing said water, by means of heat withdrawn from the reaction products, so as to form a climbing film of water in heat exchange relationship with the reaction zone, and employing heat withdrawn from the reaction products to preheat incoming reactants.

12. In the production of acetaldehyde by the catalytic oxidation of ethyl alcohol, the steps of controlling the reaction by supplying hot water to a zone, in proximity to, but separated from the catalyst-containing reaction zone and vaporizing said water, by means of heat withdrawn from the reaction products, so as to form a climbing film of water in heat exchange relationship with the reaction zone, and employing heat withdrawn from the reaction zone to preheat incoming reactants and removing the water vapor by a path surrounded by that followed by the climbing film.

13. Method of controlling exothermic catalytic reactions carried out in the vapor phase, which comprises feeding an attemperating medium into heat exchange relationship with the reaction zone, thence into heat exchange relationship with incoming reactants, and then returning the attemperating medium by a path surrounded by that originally followed.

14. In the method of effecting exothermic reactions carried out in the vapor phase, the steps of removing heat from the reaction zone by vaporization of a liquid in heat exchange with the reaction zone and removing the vapor thus generated by a path surrounded by the body of said liquid.

15. In the method of effecting exothermic catalytic reactions carried out in the vapor phase, the steps of removing heat from the reaction zone by vaporization of a liquid in heat exchange with the reaction zone, passing the vapor thus generated into heat exchange with incoming reactants and removing said vapor by a path surrounded by the body of said liquid.

16. In the method of effecting exothermic catalytic reactions carried out in the vapor phase, the steps of removing heat from a catalyst-containing reaction zone by vaporization of a liquid in heat exchange with the reaction zone and removing the vapor thus generated by a path passing downwardly through the body of said liquid.

17. In the method of effecting exothermic catalytic reactions carried out in the vapor phase, the steps of removing heat from a catalyst-containing reaction zone by vaporization of the liquid in heat exchange with the reaction zone, passing the vapor thus generated into heat exchange with incoming reactants and removing said vapor by a path passing downwardly through the body of said liquid.

18. In the method of effecting exothermic catalytic reactions carried out in the vapor phase, the steps of removing heat from the reaction zone by vaporization of a liquid in heat exchange with the reaction zone and outgoing reactants and removing the vapor thus generated by a path passing downwardly through the body of said liquid.

19. In the method of effecting exothermic reactions carried out in the vapor phase, the steps of removing heat from the reaction zone by vaporization of a liquid in heat exchange with the reaction zone and outgoing reactants, passing the vapor thus generated into heat exchange with incoming reactants and removing said vapor by a path passing downwardly through the body of said liquid.

20. In the method of effecting exothermic catalytic reactions carried out in the vapor phase, the steps of removing heat from the reaction zone by vaporization of water in heat exchange with the reaction zone and removing the vapor thus generated by a path passing downwardly through the body of said water.

21. In the method of effecting exothermic catalytic reactions carried out in the vapor phase, the steps of removing heat from a catalyst-containing reaction zone by vaporization of water in heat exchange with the reaction zone and outgoing reactants, passing the vapor thus generated into heat exchange with incoming reactants and removing said vapor by a path passing downwardly through the body of said water.

22. In the production of acetaldehyde by the catalytic oxidation of ethyl alcohol, the steps of removing heat from the reaction zone by vaporization of a liquid in heat exchange with the reaction zone and removing the vapor thus generated by a path passing downwardly through the body of said liquid.

23. In the production of acetaldehyde by the catalytic oxidation of ethyl alcohol, the steps of removing heat from a catalyst-containing reaction zone by vaporization of water in heat exchange with the reaction zone and removing the vapor thus generated by a path passing downwardly through the body of said water.

24. In the production of acetaldehyde by the catalytic oxidation of ethyl alcohol, the steps of removing heat from a catalyst-containing reaction zone by vaporization of water in heat exchange with the reaction zone and outgoing reactants, passing the water vapor thus generated into heat exchange with incoming reactants and removing said vapor by a path passing downwardly through the body of said water.

HORACE FINNINGLEY OXLEY.
WALTER HENRY GROOMBRIDGE.

CERTIFICATE OF CORRECTION.

Patent No. 2,064,317.                                              December 15, 1936

HORACE FINNINGLEY OXLEY, ET AL.

It is hereby certified that error appears in the printed specification of the above numbered patent requiring correction as follows: Page 1, first column, line 1-2, strike out the words and apparatus; and that the said Letters Patent should be read with this correction therein that the same may conform to the record of the case in the Patent Office.

Signed and sealed this 16th day of February, A. D. 1937.

(Seal)
Henry Van Arsdale
Acting Commissioner of Patents.